United States Patent Office 3,709,811
Patented Jan. 9, 1973

---

3,709,811
SPECIFIC ION ELECTRODE FOR SULFATE
Alex Michael Saunders, Bedford Village, N.Y., assignor to the United States of America as represented by the Secretary of the Department of Health, Education, and Welfare
No Drawing. Filed Sept. 21, 1970, Ser. No. 74,199
Int. Cl. G01n 27/30
U.S. Cl. 204—195 M                 4 Claims

---

ABSTRACT OF THE DISCLOSURE

An active surface area sulfate ion selective composition suitable for electrodes is achieved by mixing barium sulfate particles in a room temperature (r.t.) silicone rubber matrix, and polymerizing at about 140°–150° F. using conventional catalysts or cross-linking agents to uniformly fix or set the barium sulfate in the hardened polymers in a time zone of not more than one minute.

---

The area and importance for analytical and industrial use of ion selective electrodes and their active compositions has burgeoned both with respect to cationics and also anionics during the past decade.

The sulfate anionic measurement is directly related to the subject of the present invention.

Exemplary of the patent prior art background picture of this invention are:

U.S. 2,930,967, Laird et al.
U.S. 3,483,112, Ross.

Of greater pertinency are literature articles such as Lapskminarayanaiah, N. Chem. Rev. 65 (491) 1965, and Rechnitz, G. A., Analytical Chemistry 38, 973, 1966, which set the tone of the present state of the art. Rechnitz presents the problem, "These membranes consist of a sparingly soluble precipitate—e.g., BaSO$_4$ or AgI—immobilized in a polymerized silicone rubber matrix."

It is highly interesting that three years later, in 1969, in the highly regarded "Ion-Selective Electrodes," Durst, Department of Commerce, NBS 314 GPO (1969), p. 101, states with respect to the barium sulfate electrode:

"However, some difficulties must be present, for this electrode has not yet appeared commercially...."

The present invention seeks to overcome the difficulties found in the prior art by fixing the barium sulfate in the matrix so that the outer surfaces of a membrane remain active when utilized as an electrode.

Active Salt Component

Although all alkaline earth sulfates, i.e., Sr, Ca and Ba are operable, barium sulfate in a fine state of subdivision is preferred for utilization here. A conventional optimal grain size for the preferred barium sulfate (BaSO$_4$) precipitate is about 5–10$\mu$. In operation, it has been theorized (Rechnitz ante) that the amount and particle size of the BaSO$_4$ precipitate in the inert silicone rubber matrix must be such that the particles can be in contact with one another. Thus, there is a requirement of a substantial amount of BaSO$_4$ in the mix ranging by weight from a preferred 1:2 to 1:1 compared with the silicone. Durst (ante, 95) comments as follows:

"Optimum proportion of active material to binder is about 50%; the essential feature to the successful functioning of the electrode being that the particles of the active material should be in contact in order to achieve conduction through the membrane. Whether this conduction is achieved through the particles or over the surface is a moot point."

The SILASTIC Component

The SILASTIC or silicone rubber used as a matrix for the BaSO$_4$ precipitate is selected from a group of reactive room temperature (r.t.) vulcanizable silicones. Such compositions are selected from hydrocarbonoxy end-blocked diorganopolysiloxanes or $\alpha,\omega$-dihydroxydiorganopolysiloxanes. In general, the diorganopolysiloxanes can be represented by the general unit formula as follows:

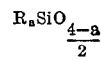

wherein $a$ has a value of from 1.9 to 2.1 and preferably from 1.99 to 2.0.

Polymerization at about room temperature may be achieved conventionally using cross-linking agents and condensation catalysts.

In general, the $\alpha,\omega$-dihydroxydiorganopolysiloxanes may be vulcanized conventionally by addition of a condensation initiator such as a perbenzoate or the reaction product of a diorganotin dicarboxylate with an orthotitanic ester (U.S. 3,409,573). Additionally, a cross-linking agent such as an orthosilicate, polysilicate ester or organotrialkoxysilane is utilized.

The niche in the patent art illustrating these materials as SILASTIC or room temperature silicone rubbers is as follows:

2,927,907, Polmanteer (Dow Corning)
3,035,016, Bruner (Dow Corning)
3,077,465, Bruner (Dow Corning)
3,268,473, Brown (Dow Corning)
3,280,072, Frankland (Midland Silicones)
3,409,573, Guinet et al. (Rhone-Poulenc, S.A.)
3,464,951, Hittmair et al. (Wacker-Chemie)
3,499,859, Matherly (Dow Corning)

The r.t. silicone, used as a matrix, is preferably in a predominant weight amount with respect to the barium sulfate and when utilized in electrode structures the membrane is about 0.5 mm. thick.

Temperature/Time

It has been found and crucially that in utilizing these silicone rubbers designed for room temperature, if the polymerization initiating temperature is raised to about 145° F. so that substantial locking or positioning of the BaSO$_4$ occurs within one minute, then a satisfactory composition for fashioning a sulfate ion electrode results. It is postulated that the time of up to about one minute is critical to retain barium sulfate particles in satisfactory fashion contiguous to the surfaces of the membrane layer.

EXAMPLES

Example 1

1 g. of finely divided BaSO$_4$ (10$\mu$ average particle size) was blended in a commercial high vacuum Osterizer with 2 g. of a SILASTIC. The high vacuum procedure was utilized to degas the liquid-particle mixture. Commercial Dow-Corning 184 and 186 were utilized on successive runs and both were utilized as room-temperature vulcanizable $\alpha,\omega$ - dihydroxydiorganopolysiloxanes. A minor amount of ammonium carbonate (.05 g.) was added during the mixing stage following the approved procedure utilized in 3,268,473, Brown (Dow Corning).

After agitation is completed, the mixture was brought to a temperature of 145° F.±2 by exterior heat units and vulcanization was initiated using .05 g. of tert-butyl-perbenzoate to catalyze the reaction. The mixture quickly set or vulcanized when placed on a glass plate and also on the tip of a glass electrode.

Example 2

1 g. of barium sulfate (8μ average particle size) was dispersed in 2 g. of a room temperature silicone rubber (G.E. "CLEAR-SEAL" identified as an α,ω-dihydroxyorganopolysiloxane) by means of a roller mill. The temperature was raised to about 145° F. and .05 g. of ethyl polysilicate cross-linking agent was added. At the end of one minute, the vulcanized mix was placed on a plate, calendered and disks about 0.4 to 0.5 mm. thick were attached to glass tubes.

Example 3

A series of experiments were made using the membrane materials of Example 2, utilizing the procedure of Rechnitz et al., Analytical Chemistry 38, 973, 974 (1966) utilizing a Beckman 76 pH meter and measuring pH output by chart with a Photovolt Model 44 potentiometric recorder. Utilizing standard fiber-junction saturated calomel reference electrodes, a series of ten experiments showed satisfactory lack of drift and sulfate specificity for the fast vulcanized barium sulfate-silicone product.

Example 4

2 g. of barium sulfate (10μ) were mixed with 2 g. of paraffin, heated to 110° F. to effect liquid form, in a high vacuum Osterizer. The purpose of the vacuum was to remove occluded gases from the mix. Initiation of the reaction was achieved by the concomitant addition of .05 g. ethyl polysilicate cross-linking agent and .005 g. tert-butylperbenzoate initiator.

The mixture was quickly cooled by external cooling units to 10° F. so that solidification occurred in about 40 seconds after the start of the reaction. The product, when utilized in procedures similar to Example 3, exhibited satisfactory conductivity response.

The embodiments of the invention in which an exclusive property or privilege is claimed are defined as follows:

1. In an electrode for potentiometric determination of the activity of ion in solution, the improvement comprising an element sensitive to sulfate ions and comprising a solid, substantially imporous membrane consisting of a silicone rubber selected from a hydroxycarbonoxy end-blocked diorganopolysiloxane or α,ω-dihydroxydiorganopolysiloxane of the formula

$$R_a SiO_{\frac{4-a}{2}}$$

wherein $a = 1.9$ to $2.1$, said membrane having a surface thereof adapted to contact said solution; said surface comprising particles of an alkaline earth sulfate embedded in said silicone rubber and wherein said silicone rubber containing the alkaline earth sulfate has been rapidly polymerized or cured by heat treating for a period of not greater than one minute at a temperature of 140°–150° F.

2. An electrode according to claim 1 wherein the ratio of alkaline earth sulfate to silicone is about 1:2 to 1:1 by weight.

3. An electrode according to claim 1 wherein the ratio of alkaline earth sulfate to silicone is about 1:2 by weight.

4. An electrode according to claim 1 where the alkaline earth sulfate is barium sulfate.

References Cited

UNITED STATES PATENTS 3,219,726    11/1965    Bailey et al. ___ 260—46.5 G X

OTHER REFERENCES

G. A. Rechnitz et al.: Analytical Chemistry, vol. 38, No. 8, pp. 973–976, July 1966.

GERALD L. KAPLAN, Primary Examiner

U.S. Cl. X.R.

260—46.5